(12) United States Patent
McCaughan et al.

(10) Patent No.: US 6,951,120 B2
(45) Date of Patent: Oct. 4, 2005

(54) MACHINING OF LITHIUM NIOBATE BY LASER ABLATION

(75) Inventors: Leon McCaughan, Madison, WI (US); Chad Matthew Staus, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 690 days.

(21) Appl. No.: 10/102,621

(22) Filed: Mar. 19, 2002

(65) Prior Publication Data

US 2004/0252730 A1 Dec. 16, 2004

(51) Int. Cl.⁷ .......................... G02F 1/035; H01L 21/00
(52) U.S. Cl. .................. 65/392; 65/385; 219/121.68; 219/121.64; 359/245; 359/237
(58) Field of Search .................... 359/245, 237; 219/121.68, 121.69; 65/385, 392

(56) References Cited

U.S. PATENT DOCUMENTS

| | | | |
|---|---|---|---|
| 4,820,897 A | * 4/1989 | Lefevre | 219/121.67 |
| 4,940,302 A | 7/1990 | Houk et al. | |
| 5,128,007 A | * 7/1992 | Matsunaga et al. | 204/192.13 |
| 5,271,957 A | 12/1993 | Wernberg et al. | |
| 5,310,448 A | * 5/1994 | Bordui et al. | 423/594.8 |
| 5,393,371 A | * 2/1995 | Chang et al. | 216/24 |
| 5,561,549 A | 10/1996 | Hatori et al. | |
| 5,728,603 A | 3/1998 | Emesh et al. | |
| 6,069,729 A | 5/2000 | Gill et al. | |
| 6,128,030 A | 10/2000 | Kikuchi et al. | |
| 6,172,791 B1 | 1/2001 | Gill et al. | |
| 6,337,465 B1 | 1/2002 | Masters et al. | |
| 6,432,278 B2 | 8/2002 | Sugioka et al. | |
| 6,545,791 B1 | * 4/2003 | McCaughan et al. | 359/245 |

OTHER PUBLICATIONS

Kazuto Noguchi, et al., "A Broadband Ti:LiNbO3 Optical Modulator with a Ridge Structure," J. of Lightwave Technology, vol. 13, No. 6, Jun. 1995, pp. 1164–1168.

M. Levy, et al., "Fabrication of single–crystal lithium niobate films by crystal ion slicing," Appl. Phys. Lett., vol. 73, No. 16, Oct. 19, 1998, pp. 2293–2295.

V.A. Joshkin, et al., "Growth of oriented lithium niobate on silicon by alternating gas flow chemical beam epitaxy with metalorganic precursors," Appl. Phys. Lett. vol. 76, No. 15, Apr. 10, 2000, pp. 1–3.

D. Saulys, et al., "An examination of the surface decomposition chemistry of lithium niobate precursors under high vacuum conditions," J. of Crystal Growth, vol. 17, 2000, pp. 287–301.

I.–L. Gheorma, et al., "Thin Layer Design of X–Cut LiNbO3 Modulators," IEEE Photonics Technology Letters, vol. 12, No. 12, Dec. 2000, pp. 1618–1620.

(Continued)

*Primary Examiner*—Nikita Wells
(74) *Attorney, Agent, or Firm*—Foley & Lardner LLP (57) ABSTRACT

Machining of crystalline lithium niobate is carried out utilizing a laser having a beam with a wavelength near the absorption edge of lithium niobate. The laser beam is provided in pulses of short duration and at a repetition rate selected to ablate the surface of the lithium niobate without damaging the bulk material. Translation of the laser beam and the substrate with respect to each other can be carried out to define a trench of a desired geometry in the lithium niobate.

39 Claims, 7 Drawing Sheets

OTHER PUBLICATIONS

I.P. Kaminow, et al., "Loss in Cleaved Ti–Diffused LiNbO3 Waveguides," Appl. Phys. Lett. vol. 33, No. 1, Jul. 1, 1978, pp. 62–64.

R.S. Weis, et al., "Lithium Niobate: Summary of Physical Properties and Crystal Structure," Appl. Phys. A 37, 1985, pp. 191–203.

Kazuto Noguchi, "Millimeter–Wave Ti:LiNbO3 Optical Modulators," *J. of Lightwave Technology*, vol. 16, No. 4, Aug. 1998, pp. 615–619.

V. Joshkin, et al., "Two–stage Growth of Patterned Epitaxial Lithium Niobate for Photonic Application," IUVSTA 15th International Vacuum Congress (IVC–15), Nov. 1, 2001, abstract printed from worldwide web Oct. 30, 2001.

F.K. Christensen, et al., "Sub–band–gap laser micromachining of lithium niobate," Appl. Phys. Lett., vol. 66, No. 21, May 22, 1995, pp. 2772–2773.

I. Bauman, et al., "Generation of Submicron Surface Gratings in Li NbO3 by Pulsed UV–Laser Ablation," Annual Report, 1995, Universitat Poderborn, pp. 24–25.

L. Kovacs, et al., "Composition dependence of the ultraviolet absorption edge in lithium niobate," Appl. Phys. Lett., vol. 70, No. 21, May 26, 1997, pp. 2801–2803.

M. Levy, et al., "Fabrication of single–crystal lithium niobate films by crystal ion slicing," Appl. Phys. Lett., vol. 73, No. 16, Oct. 19, 1998, pp. 2293–2295.

Tadashi Ichikawa, et al., "Li NbO3 platforms for optical fiber alignment." Toyota Central Research and Development Labs, Inc., 1998, pp. 1–16.

S. Mailis, et al., "Fabrication of surface relief gratings on lithium niobate by combined UV laser and wet etching," Electronics Letters, vol. 36, No. 21, Oct. 12, 2000, pp. 1801–1803.

* cited by examiner

MACHINING OF LITHIUM NIOBATE BY LASER ABLATION

REFERENCE TO GOVERNMENT RIGHTS

This invention was made with United States government support awarded by the following agency: NSF 9632527 and 0079983. The United States government has certain rights in this invention.

FIELD OF THE INVENTION

This invention pertains generally to the field of crystalline metal oxide films and methods of producing such materials.

BACKGROUND OF THE INVENTION

Ferroelectrics such as lithium niobate (an oxide) possess a large non-resonant second-order optical nonlinearity which makes such materials useful for fabrication of a variety of optical and opto-electronic devices. Examples include optical switches and modulators, frequency shifting devices, polarized controllers, pulsed waveguide lasers, surface-acoustic-wave filters, and acousto-optic devices. These materials also often possess additional useful properties, such as piezoelectric, elasto-optic, and pyroelectric effects. Conventionally, such devices are fabricated from the bulk crystal material (typically a wafer about 0.5 to 1 mm thick), although most devices use only a small fraction of the surface volume of the material. Because these oxides tend to be chemically very inert, there are only a very limited number of surface modification tools (e.g., thermal diffusion) that can be used for fabrication purposes.

Numerous attempts have been made to grow crystalline $LiNbO_3$ and other $ABO_3$ ferroelectrics (where A and B are other metals) on various substrates. $LiNbO_3$ thin films, for example, have been grown on semiconductors (e.g., Si and Ge), on dielectrics (e.g., MgO and $Al_2O_3$) and on ferroelectrics (e.g., $LiTaO_3$ and $LiNbO_3$ itself). In general, the objective of such deposition processes is to produce a crystalline thin film, since the crystalline form of the material usually has the best optical and electronic film qualities (e.g., optical transparency and nonlinear properties). Crystalline forms (e.g., single crystal textured, or polycrystalline) forms of these materials, however, etch very slowly with etchants current available. For example, a 50% aqueous solution of HF will have a negligible effect on single crystal $LiNbO_3$, and reactive ion etching (RIE) using $CCl_2F_2$:Ar:$O_2$ results in only about 3 $\mu$m/h etch rate. These etch rates are comparable to the etch rates for the masking materials that are used, making high resolution geometries essentially infeasible and resulting in very rough sidewalls with large optical losses. See J. L. Jackel, et al., "Reactive Ion Etching of $LiNbO_3$," Applied Phys. Lett., Vol. 38, 1981, pp. 970 et seq.

Among the devices that utilize $LiNbO_3$ are traveling wave electro-optic modulators. $LiNbO_3$ traveling wave modulators are currently formed utilizing a $LiNbO_3$ substrate containing a Mach-Zehnder waveguide geometry, a buffer layer (a thin dielectric film such as $SiO_2$ isolating the light in the waveguide from the metal electrodes), and metal electrodes in the form of a microwave strip line. State of the art commercial traveling wave modulators (TWMs) using these structures have a 7 GHz bandwidth (corresponding to 10 Gb/s maximum transmission rate for non-return to zero (NRZ) coding) and an operating voltage at the maximum speed of $V_\pi$@7 GHz=6 volts. At 40 Gb/s (30 GHz bandwidth, NRZ), numerical simulation shows that the conventional $LiNbO_3$ TWM requires a drive voltage of about 9 volts with an electrode length L=1.6 cm and thickness $t_e$=30 $\mu$m. However, the available gallium arsenide drive electronics at this bit rate has a maximum voltage swing of about ±4.5 volts. Thus, the conventional TWM structure would theoretically be capable of attaining the 40 Gb/s bit rate, but there is no margin of error to allow for processing variability. To account for thermal voltage degradation and process variations in the electronics, a margin of error of about 10% must be allowed (i.e., the TWM must be capable of operating at ±4 volts).

Noguchi, et al. ("A Broadband Ti:$LiNbO_3$ Optical Modulator with a Ridge Structure," J. of Lightwave Technology, Vol. 13, No. 6, June 1995, pp. 1164–1168) have shown that etching 3–4 $\mu$m deep ridges in the $LiNbO_3$ above the Mach-Zehnder waveguides produces a better overlap between the optical and microwave fields, thereby allowing the drive voltage to be reduced. However, difficulties are encountered in making commercial devices having such structures because, as noted above, the etch rates of crystalline $LiNbO_3$ are very slow. The resulting surfaces are rough, significantly increasing the waveguide's propagation loss. In addition, the reliability of devices made using present etching techniques is questionable. A variation of this approach is shown in U.S. Pat. No. 6,172,791 to Gill, et al., in which ion implantation is used to allow etching at an angle to form ridges with reentrant sidewalls to further shape the electric field in the ridges. Laser ablation has also been used to machine grooves into lithium niobate. Typically, excimer lasers having wavelengths well below the absorption edge have been used for machining lithium niobate. However, the sidewalls of grooves formed in this manner are typically too rough and have too large losses to be used to define the walls of a waveguide.

SUMMARY OF THE INVENTION

In accordance with the present invention, substrates formed of metal oxide materials, in particular lithium niobate, are machined utilizing pulsed laser ablation at selected wavelengths at or just outside the absorption edge of the material and at a selected pulse repetition rate. The laser wavelength is selected to be near enough to the absorption edge of the material to be absorbed to ablate material from the substrate. For machining of lithium niobate, the laser wavelength is preferably chosen to be above the absorption edge at about 310 nm and below about 370 nm, preferably at 355 nm. A suitable laser providing an output at 355 nm is a frequency tripled Q switched Nd:YAG laser. The laser power is applied in pulses that preferably have a pulse duration in the range of tens of nanoseconds, e.g., about 40 ns, with large energies and relatively low pulse repetition rates in the range of a few KHz and preferably about 1 KHz. By utilizing such pulses of laser light, it is found that surface layers of the substrate are continuously removed while the bulk material is left unharmed, allowing formation of trenches in materials such as lithium niobate that have smooth trench wall surfaces that are suitable for defining waveguide walls. Further, the laser machining in accordance with the invention may be utilized to cut through the entire thickness of a wafer of crystalline material such as lithium niobate to provide smooth surfaced facets at the cut edge.

In carrying out the present invention, the laser source may be mounted to direct its output beam toward a reflective mirror that deflects the beam to a lens that focuses the waist of the beam onto the surface of the substrate, e.g., crystalline lithium niobate. The laser beam and substrate are translated with respect to each other to ablate material from the substrate in a pattern. For example, the substrate may be mounted on a translation stage that can be selectively translated in three orthogonal directions under control of a computer that is programmed to move the stage in arbitrary patterns. The positioning velocity, acceleration and deceleration can be specified along the x, y or z directions. The laser beam may also be deflected with respect to the substrate in a controlled pattern.

Further objects, features and advantages of the invention will be apparent from the following detailed description when taken in conjunction with the accompanying drawings.

DETAILED DESCRIPTION OF THE INVENTION

For purposes of illustrating the invention and its applications, the following describes the utilization of the invention in forming optical elements such as optical modulators. An optical modulator is a device that converts data from an electrical to an optical format. For high-speed optical communications (>100 Mb/s), there are basically two types of modulators in use: the electro-absorption modulator (EAM) and the electro-optic (EO) modulator. The EAM is a semiconductor-based device that absorbs light when subjected to an electric field (i.e., the quantum Stark effect). The EAM is currently deployed for fiber optic systems that operate at or below the 2.5 Gb/s rate. For higher bit rates (10 Gb/s and beyond), the EAM has several drawbacks, including: the presence of chirp (spectral broadening brought on by a change in the device's refractive index, owing to the injection of carriers), limited modulation depth, and wavelength sensitivity. The EO modulator does not have these drawbacks. However, the EO devices now fabricated in bulk $LiNbO_3$ cannot be operated at both high speeds and low voltages and with a characteristic impedance in the preferred range of 50 ohms.

Figure 1:
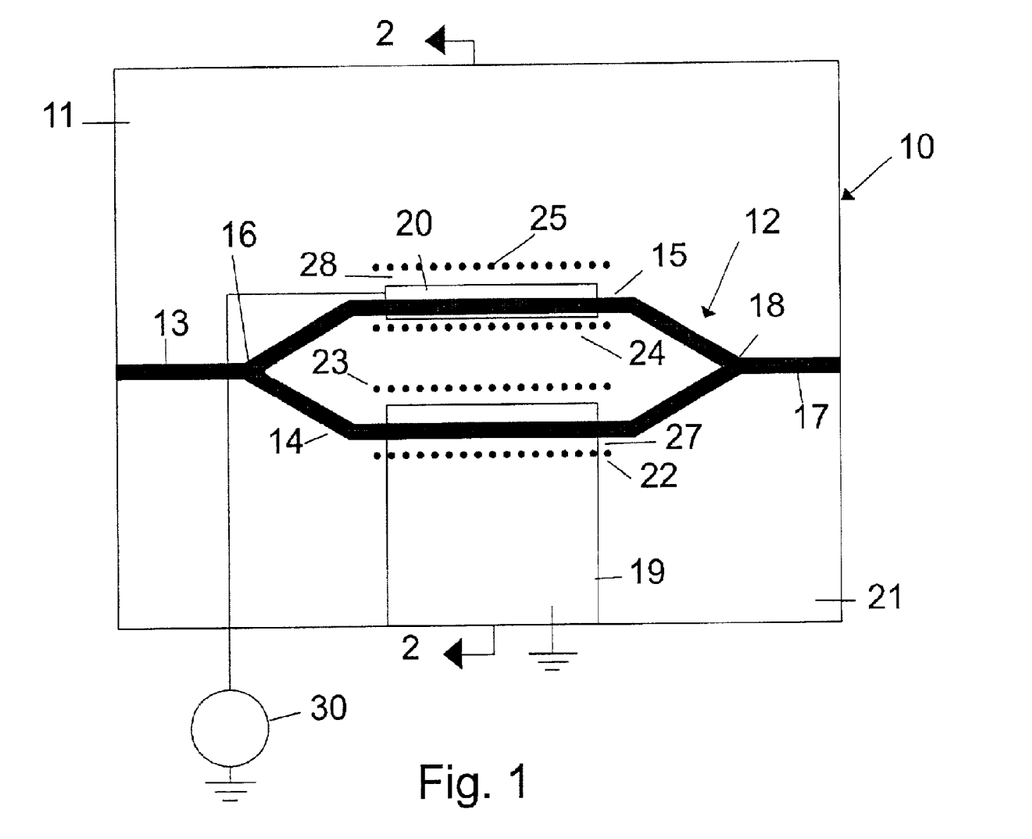
FIG. 1 is a schematic diagram of a Mach-Zehnder modulator that may be formed utilizing the present invention.
Figure 2:
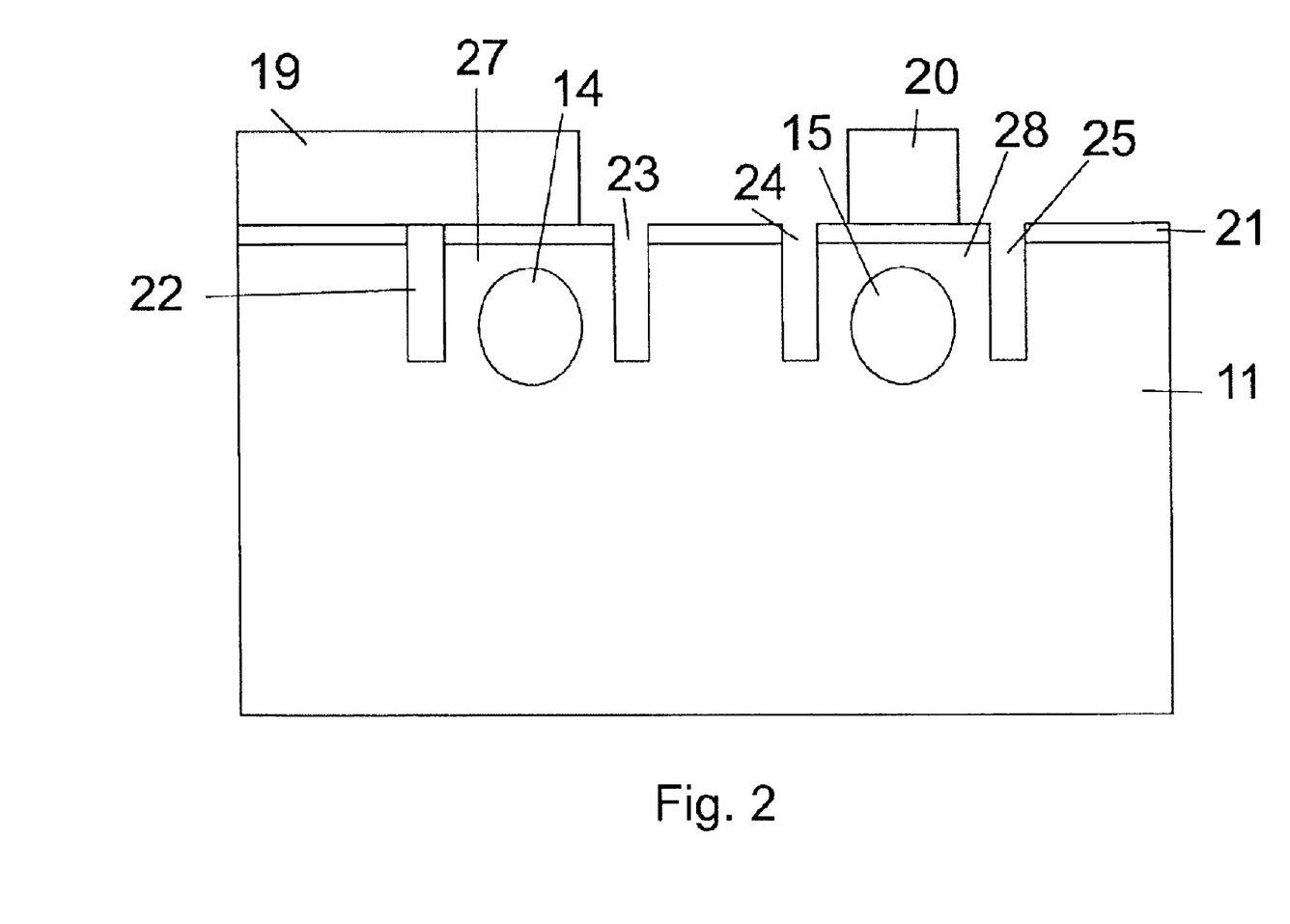
FIG. 2 is a simplified cross-sectional view of the Mach-Zehnder modulator of FIG. 1 taken generally along the lines 2—2 of FIG. 1.
Figure 3:
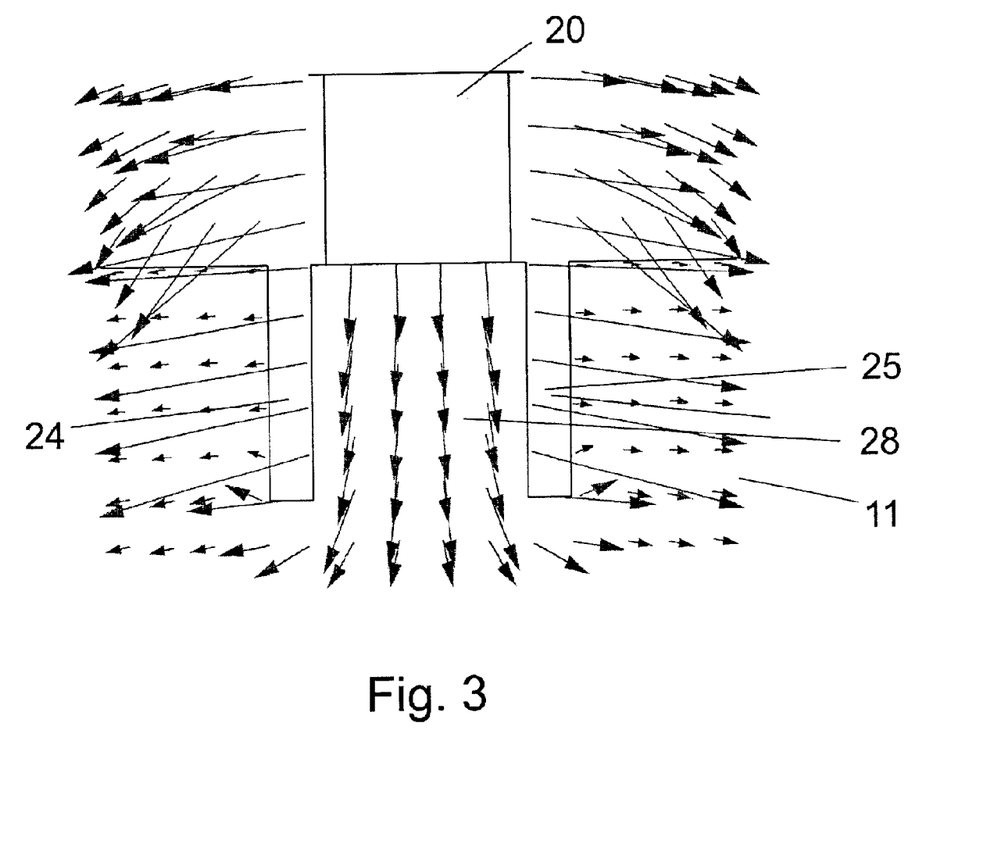
FIG. 3 is a schematic diagram of an electric field profile for a traveling wave electrode on, e.g., lithium niobate into which has been formed a pair of deep trenches to define a ridge on which an electrode is formed.
Figure 4:
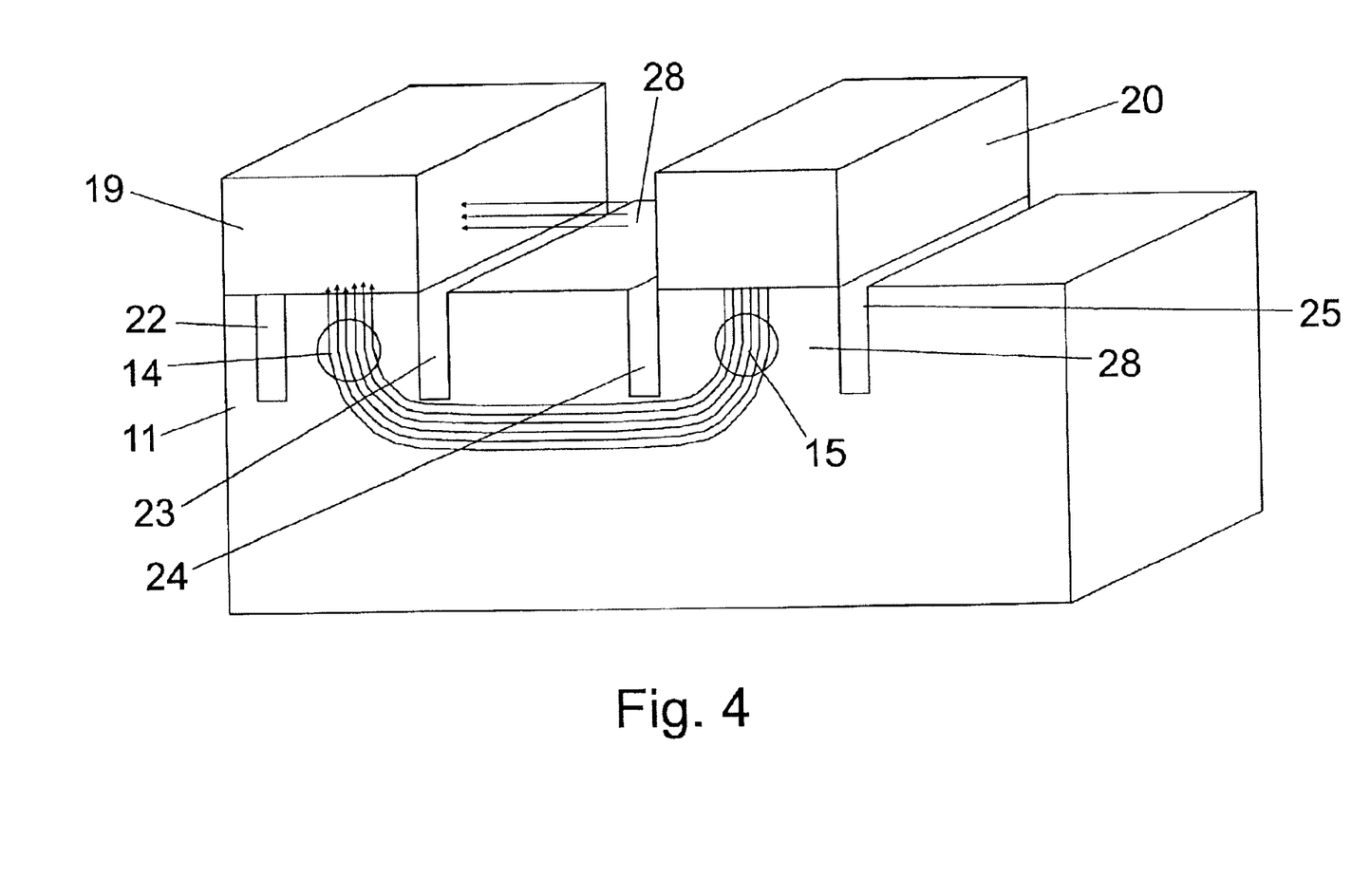
FIG. 4 is a simplified perspective view of a portion of the modulator structure of FIGS. 1–3.

The most commonly used EO modulator is based on the Mach Zehnder configuration of the type shown at 10 in FIG. 1. The modulator is formed in an electro-optical material 11 (conventionally, a substrate of single crystal lithium niobate) and includes a waveguide 12 having an input path 13, a first arm 14 and a second arm 15 that are split from the input path 13 at a splitter 16, and an output path 17 to which the first and second arms 14 and 15 are coupled at a coupler 18. Electrodes 19 and 20 are positioned to take advantage of the largest electro-optic coefficient in the material (e.g., $r_{33}$ in $LiNbO_3$). For a z-cut orientation, this corresponds to having both electrodes positioned directly above the waveguides 14 and 15, respectively. In this case, a thin (0.25–1 $\mu$m) dielectric layer 21 (e.g., $SiO_3$) is needed to isolate the electrodes 19 and 20 from the waveguides. Trenches 22, 23, 24 and 25 are formed in the electro-optic material 11 to compensate for microwave/optical velocity mismatch and to improve the microwave/optical field overlap. Waveguides are effectively defined between the trenches in which the walls of the trenches are the walls of the waveguides. As discussed below, the material 11 may be a substrate of single crystal $LiNbO_3$. An electrical signal from a source 30 is used to produce an electric field in one arm 15 (or both arms) of the device 10; this electric field causes a change in the refractive index of the material in the arm or arms, which produces a relative change in the phase of the two light fields entering the coupler 18. The preferred electro-optic material 11 in which the arms 14 and 15 are formed is lithium niobate, $LiNbO_3$. At high modulation rates, it is necessary that the applied electrical signal and the light in the Mach-Zehnder arm travel with near-equal or equal velocities. In order to accomplish this, the electrodes 19 and 20 take the form of microwave striplines, and this type of modulator has come to be known as the traveling wave modulator (TWM).

Because of the extreme inertness of lithium niobate, it is generally infeasible to significantly modify the surface structure of this material. Features such as the ridge optical waveguides and air trenches as discussed above are useful to incorporate into integrated optic devices to improve the confinement of both optical and radio frequency (RF)/microwave fields, and to allow the optical and electrical characteristics to be tailored to the device needs and thereby improve performance. In addition, the use of trenches can also eliminate propagation of surface acoustic waves which can rob microwave energy from electro-optic devices. The present invention can be utilized to form the trenches 22, 23, 24 and 25 with relatively smooth sidewalls and with precisely controlled lateral dimensions.

Figure 5:
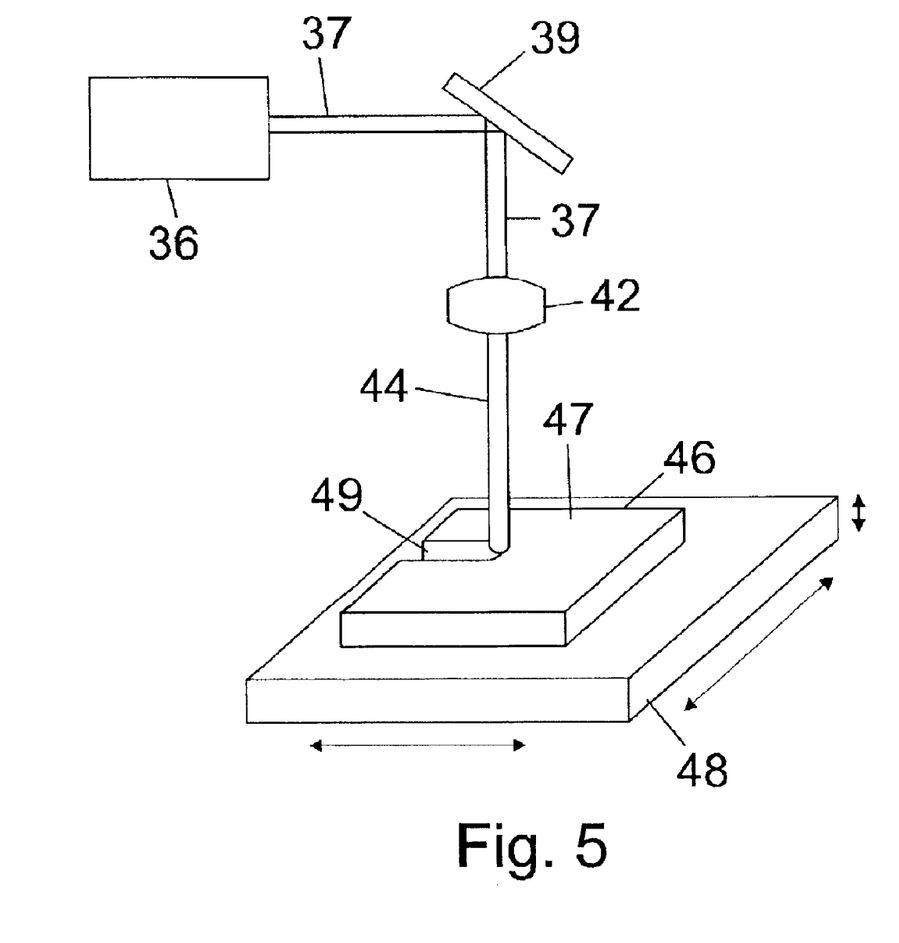
FIG. 5 is a schematic view of laser machining apparatus that may be utilized in carrying out the present invention.

An apparatus which may be utilized for carrying out machining of lithium niobate to form trenches in accordance with the present invention is illustrated in FIG. 5. A suitable laser 36, as discussed below, provides an output beam 37 that is deflected by a 45° angle mirror 39 that is highly reflective to the wavelength of the light from the laser. The deflected beam 37 can optionally be passed through a mask having a mask opening therein, or passed directly without the use of a mask to a lens 42 that focuses the beam 37 into a precisely defined beam 44 which impinges upon a substrate 46, e.g., bulk crystalline $LiNbO_3$, having a surface 47. The substrate 46 is mounted on a stage 48 which is translatable in x, y and z directions so that the substrate 46 and the beam 44 can be translated with respect to each other to cut a trench 49 having a desired pattern (e.g., a straight line, s-curve, etc.). Alternatively, the beam 44 can be deflected with respect to the substrate 46 to provide relative translation, for example, by using y and x scanning mirrors similar to those used in, e.g., laser scanning confocal microscopes. In addition, the substrate may be photolithographically patterned with a mask, made of a highly reflecting material such as a metal or an oxide or of an absorbing material such as a photoresist. Windows in the mask material may be utilized to define narrower etched features than might be achieved with a beam alone.

A preferred laser ablation source 36 provides an output beam at a wavelength above about 310 nm and below about 370 nm, preferably at about 355 nm. The laser provides pulses of selected duration of a few tens of nanoseconds, e.g., 40 ns pulses, and preferably with a selectable pulse repetition frequency less than about 2000 Hz and selectable energy per pulse. The laser beam output is directed horizontally towards the mirror 39 which is selected to be highly reflective at the laser wavelength. The mirror 39 directs the laser beam 37 to the lens 42 (e.g., having a focal length of about 11 cm) to focus the light beam onto the surface 47 of the $LiNO_3$ substrate 46, which is located on the x-y-z translation stage 48. The translation stage is controlled by a computer (not shown) and can be programmed to move in arbitrary patterns. The position velocity, acceleration, and deacceleration can also be specified along x, y or z directions.

Figure 8:
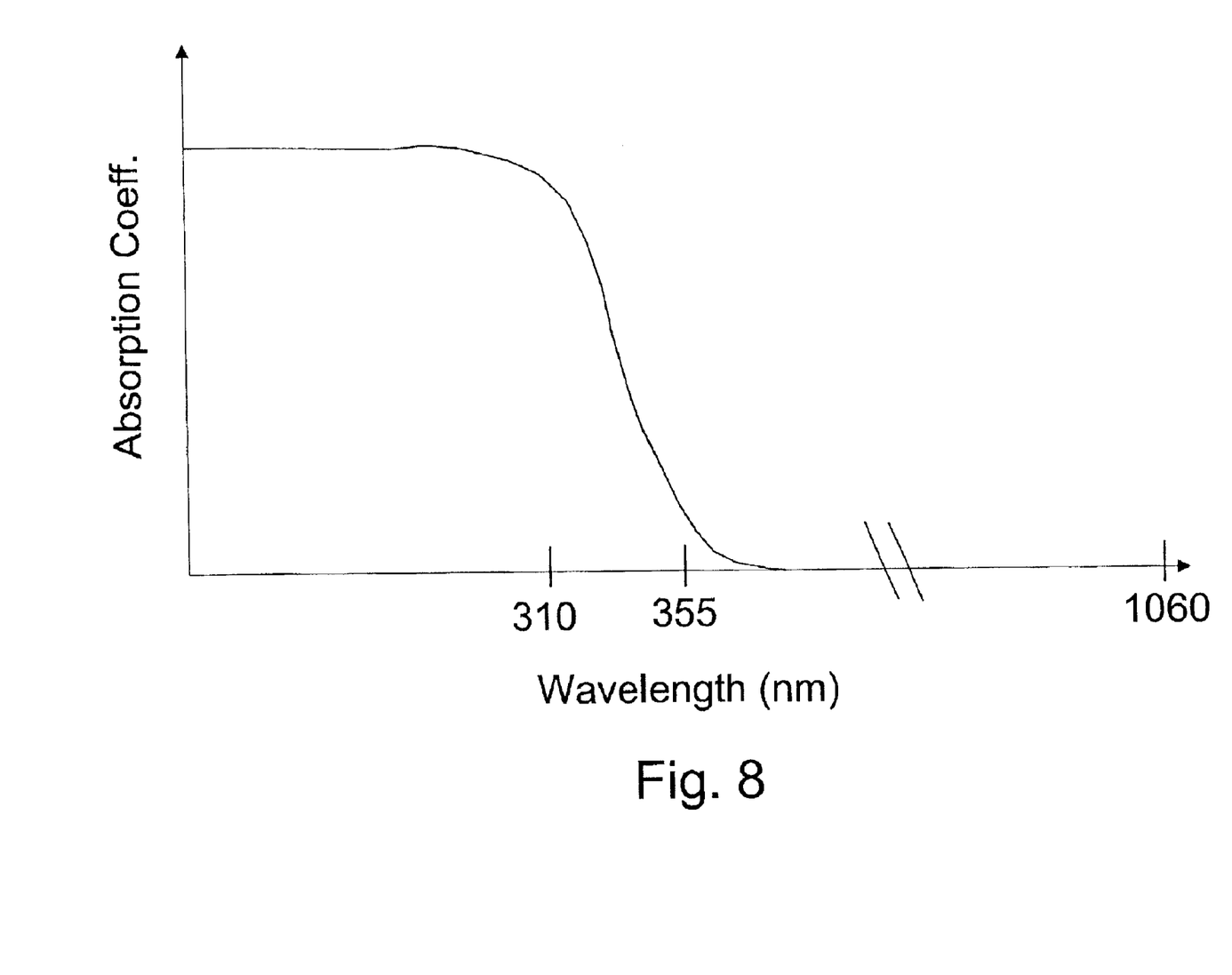
FIG. 8 is a graph of absorption coefficient as a function of wavelength for lithium niobate.

An appropriate laser 36 for use in machining lithium niobate is a frequency tripled, Q switched Nd:YAG (neodymium:yttrium-aluminum-garnet) laser providing a 40 ns pulse output with a wavelength at 355 nm that is near to but above the absorption edge of lithium niobate. A 355 nm (3.5 eV) wavelength is preferred because it is above the absorption edge of congruent $LiNbO_3$, but is partially absorbed by the lithium niobate substrate. The use of this wavelength can produce a more refined ablation process than wavelengths below the absorption edge as used in conventional laser ablation techniques, resulting in smoother walled $LiNbO_3$ trenches. A graph illustrating the absorption coefficient of $LiNbO_3$ as a function of wavelength is shown in FIG. 8. As seen from this graph, the absorption coefficient rapidly drops off above 310 nm to zero above about 370 nm. In accordance with the invention, applying laser pulses at wavelengths above the absorption edge, but which are still partially absorbed by the material, is found to result in ablation of trenches having smoother walls than generally obtained with lasers at wavelengths that are more fully absorbed by the material.

This ablation process is facilitated by the fact that $Li_2O$ will diffuse out of $LiNbO_3$ on heating, and that lowering the Li/Nb ratio shifts the absorption edge to longer wavelengths (by about 15–20 nm), which is sufficient to greatly increase the energy absorption. See, Kovacs, et al., App. Phys. Lett., Vol. 70, 1997, pp. 2601 et seq. A likely sequence is that localized heating from the beam causes local surface depletion of $LiO_2$, followed by locally higher absorption, resulting in ablation (melting and vaporization/sputtering) of a thin layer, which exposes a layer below it in which the process is repeated. It is also noted that because $LiNbO_3$ is an insulator, there are virtually no free electrons in the conduction band at room temperature. Because the energy of the irradiating light beam (e.g., 355 nm, corresponding to 3.5 eV) is less than the band gap of $LiNbO_3$ (4 eV), no electron-hole pairs are produced in the bulk material. However, single photons can create electron-hole pairs at defect and surface states. Incident laser radiation on the surface of the $LiNbO_3$ will be absorbed, creating many more electron hole pairs near the surface than in the bulk. The electron hole pairs will recombine nonradiatively and heat the surface layer. Heating further reduces the bandgap near the surface, resulting in more absorption. This process will continue, resulting in rapid heating of the surface layer followed by melting and eventual vaporization or sputtering of the surface $LiNbO_3$. During a relatively short duration pulse (e.g., 40 ns), surface layers are continuously removed while the bulk material is left unharmed. The result is a trench in the $LiNbO_3$ with smooth surfaces.

In accordance with the invention, low pulse repetition rates (a few kHz and preferably about 1 kHz) combined with long pulses (about 40 ns) with energies in the range of 50–250 µJ are found to be an effective and controlled way to ablate trenches in $LiNbO_3$. Under such conditions, a single scan will ablate away about 5–25 µm of material in a trench, depending on the energy in each pulse. Since a low repetition rate is used, the $LiNbO_3$ substrate will have time to return to its equilibrium temperature before the next pulse arrives. Therefore, thermal damage is minimized near the ablation area.

Figure 6:
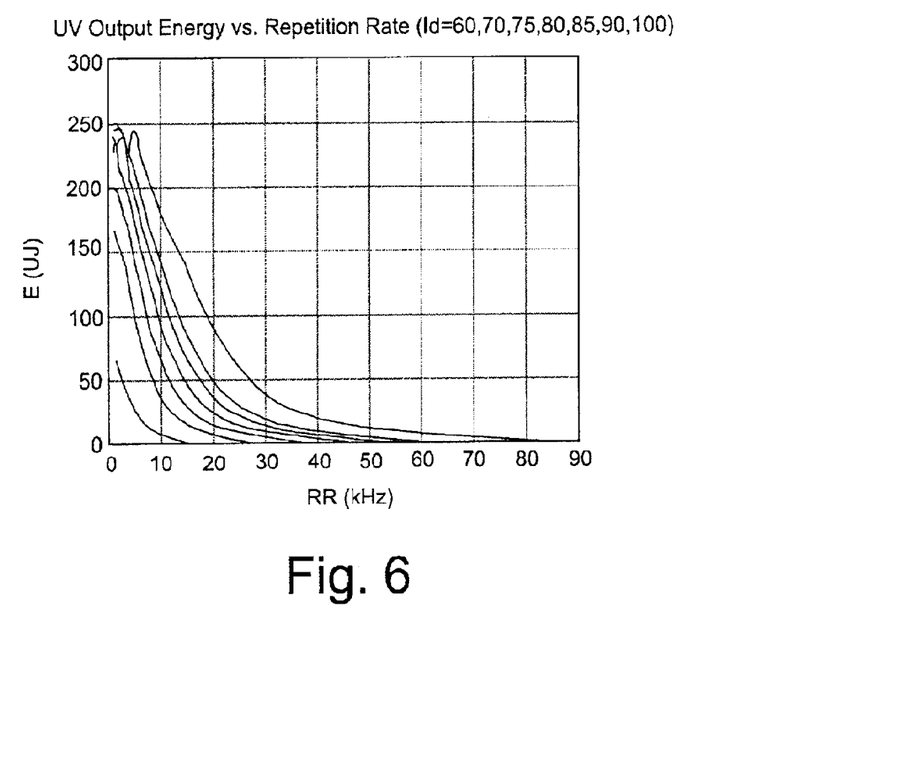
FIG. 6 are graphs illustrating the relationship of energy per pulse versus repetition rate of the laser utilized for machining in accordance with the present invention.
Figure 7:
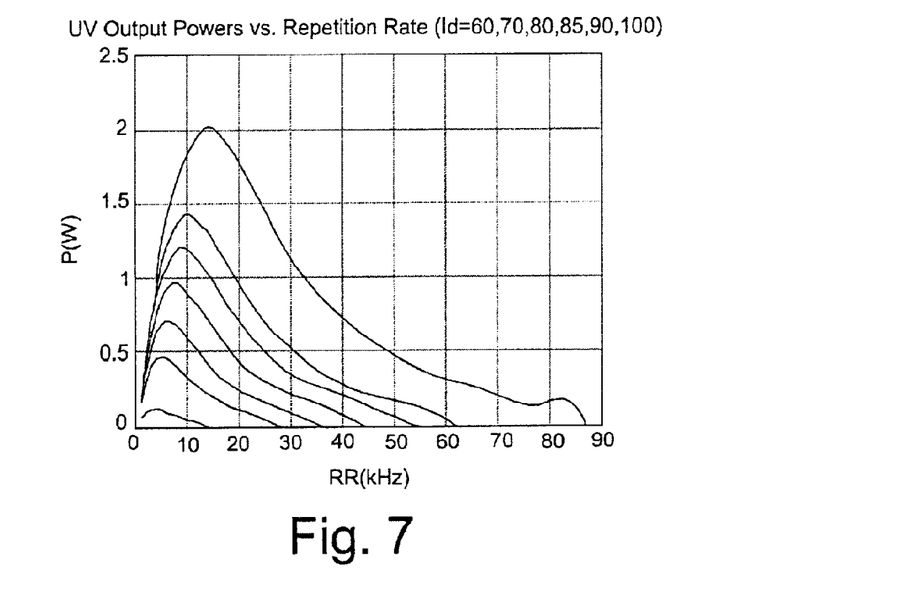
FIG. 7 are graphs illustrating average power versus repetition rate for the laser utilized in the laser machining of the present invention.

Fabricating smooth straight trenches in $LiNbO_3$ involves the selection of five parameters: the energy per pulse, frequency of pulses (repetition rate), average output power, stage velocity (translation velocity), and stage height. The stage height determines the position of the beamwaist relative to the surface of the $LiNbO_3$ sample. The energy per pulse and the average output power are each dependent on the selected repetition rate. These dependencies are shown in FIGS. 6 and 7. The repetition rate, UV energy/pulse, and the stage height are the three parameters that affect trench characteristics the most. Two examples of sets of parameter values that were used to produce trenches in $LiNbO_3$ with very smooth surfaces and straight sidewalls are listed below. The laser used was a Coherent Avia 1.5 W frequency tripled Q-switched Nd:YAG laser, and the substrate was mounted on a commercial xyz translator from Newport Co. with a programmable driver (ISP 300).

Trench 1
Wavelength=355 nm
Energy/40 ns pulse=54 µJ
Average Power=50 mW
Repetition Rate=1000 Hz
Stage Velocity=0.25 mm/s
Beamwaist location=0.305 mm above the $LiNbO_3$ surface
Trench 2
Wavelength=355 nm
Energy/40 ns pulse=80 µJ
Average Power=80 mW
Repetition Rate=1000 Hz
Stage Velocity=0.25 mm/s
Beamwaist location=1.220 mm above the $LiNbO_3$ surface Under the foregoing condition, trenches with depths ranging from 5 µm to 30 µm and widths from 20 µm to 30 µm can be produced.

The laser 36 can also be used for cutting $LiNbO_3$. The combination of a high repetition rate and a high average power induces $LiNbO_3$ to cleave along any direction. The resulting cross-sections are found to be extremely smooth and flat, except where the laser begins the initial cleaving. This initial cleaving area can be neglected if the $LiNbO_3$ substrate is initially cut on a face of the substrate that contains no features. The substrate can then be diced in this manner in arbitrary polygon shapes with smooth cross-sectional features preserved on the important face. The cross-sectional cleaved surfaces are found to be extremely smooth and their trench features perfectly preserved. Using this technique to produce optically smooth facets eliminates the need to cut and optically polish $LiNbO_3$ prior to fiber attachment—significantly reducing manufacturing times. The following are exemplary parameters that can be used to laser cut $LiNbO_3$ in the manner described above:

Wavelength=355 nm
Energy/40 ns pulse=24 µJ

Average Power=.74 W
Repetition Rate=30 kHz
Stage Velocity=0.4 mm/s
Beamwaist location=1.168 mm below the $LiNbO_3$ surface.

As an example, waveguides were fabricated in $LiNbO_3$ by diffusing in 9 μm wide by 90 nm thick strips of Ti at 1050° C. for 9 h. Ordinarily, in order to efficiently couple light at 1.5 μm from a single mode fiber into and out of these waveguides, the ends of the $LiNbO_3$ crystal would be cut (e.g., with a wire saw) and polished using a range of grit sizes from 40 μm to submicron colloidal silica. Instead, the ends of the crystal were cut perpendicular to the propagation direction of the waveguides using the 355 nm pulsed laser with the above described conditions. A fiber carrying 1.5 μm wavelength light was brought within 10 μm of the input end. The output end of the waveguide, when viewed with an IR camera, showed an intense, well-defined, single mode spot of light. Nearly identical results were obtained for all four waveguides tested, indicating the both the input and output surfaces of the $LiNbO_3$ substrate were featureless to better than about 0.1 μm. No features can be detected under a scanning electron microscope.

It is understood that the invention is not confined to the particular embodiments set forth herein as illustrative, but embraces all such forms thereof as come within the scope of the following claims.

What is claimed is:

1. A method of machining crystalline lithium niobate comprising:
   (a) providing a substrate of crystalline lithium niobate having a surface;
   (b) applying a laser beam in pulses to the surface of the lithium niobate substrate to ablate material from the substrate, the laser beam having a wavelength above the absorption edge of the lithium niobate substrate and near enough to the absorption edge to be absorbed to ablate material from the substrate; and
   (c) translating the laser beam and the substrate with respect to each other to ablate material from the substrate in a pattern.

2. The method of claim 1 wherein the laser beam is provided at a wavelength above about 310 nm and less than about 370 nm.

3. The method of claim 2 wherein the laser beam is provided from a frequency tripled Q switched Nd:YAG laser.

4. The method of claim 1 wherein the wavelength of the laser beam is at about 355 nm.

5. The method of claim 4 wherein the pulses in the laser beam have a duration in the range of tens of nanoseconds.

6. The method of claim 4 wherein the pulses in the laser beam have a duration of about 40 nanoseconds.

7. The method of claim 5 wherein the repetition rate of the pulses in the laser beam is about 1000 Hz.

8. The method of claim 1 further including mounting the crystalline lithium niobate substrate to a translation stage that is translatable in at least x and y directions with respect to the surface of the substrate, and wherein translating the laser beam and the substrate with respect to each other is carried out by translating the stage and the substrate mounted thereto with respect to the laser beam.

9. The method of claim 1 wherein the laser beam and the substrate are translated with respect to each other to form a trench into the surface of the substrate.

10. The method of claim 1 wherein the laser beam and the substrate are translated with respect to each other to cleave the substrate.

11. The method of claim 1 wherein the energy per laser pulse is in the range of 50 to 250 μJ.

12. The method of claim 11 wherein the average power of the laser beam is about 50 mW.

13. A method of machining crystalline lithium niobate comprising:
   (a) providing a substrate of lithium niobate having a surface;
   (b) directing a laser beam from a frequency tripled Q switched Nd:YAG laser in pulses onto the surface of the lithium niobate substrate to ablate the surface, the beam provided at a wavelength of about 355 nm in pulses of durations of tens of nanoseconds at a pulse repetition rate of less than 2000 Hz; and
   (c) translating the laser beam and the substrate with respect to each other to ablate the surface of the substrate in a pattern.

14. The method of claim 13 wherein the pulses in the laser beam have a duration of about 40 nanoseconds.

15. The method of claim 14 wherein the repetition rate of the pulses in the laser beam is about 1000 Hz.

16. The method of claim 13 further including mounting the crystalline lithium niobate substrate to a translation stage that is translatable in at least x and y directions with respect to the surface of the substrate, and wherein translating the laser beam and the substrate with respect to each other is carried out by translating the stage and the substrate mounted thereto with respect to the laser beam.

17. The method of claim 13 wherein the laser beam and the substrate are translated with respect to each other to form a trench into the surface of the substrate.

18. The method of claim 13 wherein the laser beam from the laser is deflected by a mirror to a lens and is focused by the lens onto the substrate surface.

19. The method of claim 13 wherein the energy per laser pulse is in the range of 50 to 250 μJ.

20. The method of claim 19 wherein the average power in the laser beam is about 50 mW.

21. A method of machining crystalline lithium niobate comprising:
   (a) providing a substrate of crystalline lithium niobate having a surface;
   (b) applying a laser beam in pulses to the surface of the lithium niobate substrate at a pulse repetition rate and average power sufficient to cleave the substrate, the laser beam having a wavelength above the absorption edge of the lithium niobate substrate and near enough to the absorption edge to be absorbed by the substrate; and
   (c) translating the laser beam and the substrate with respect to each other to cleave the substrate in a pattern.

22. The method of claim 21 wherein the laser beam is provided at a wavelength above about 310 nm and less than about 370 nm.

23. The method of claim 22 wherein the laser beam is provided from a frequency tripled Q switched Nd:YAG laser.

24. The method of claim 21 wherein the wavelength of the laser beam is at about 355 nm.

25. The method of claim 24 wherein the pulses in the laser beam have a duration in the range of tens of nanoseconds.

26. The method of claim 24 wherein the pulses in the laser beam have a duration of about 40 nanoseconds.

27. The method of claim 25 wherein the repetition rate of the pulses in the laser beam is about 30 kHz.

28. The method of claim 21 further including mounting the crystalline lithium niobate substrate to a translation stage that is translatable in at least x and y directions with respect to the surface of the substrate, and wherein translating the laser beam and the substrate with respect to each other is carried out by translating the stage and the substrate mounted thereto with respect to the laser beam.

29. The method of claim 21 wherein the laser beam is focused by a lens to have a beam waist below the substrate surface.

30. The method of claim 21 wherein the energy per laser pulse is about 24 $\mu$J.

31. The method of claim 21 wherein the average power of the laser beam is about 0.74 W.

32. A method of machining crystalline lithium niobate comprising:
   (a) providing a substrate of lithium niobate having a surface;
   (b) directing a laser beam from a frequency tripled Q switched Nd:YAG laser in pulses onto the surface of the lithium mobate substrate, the beam provided at a wavelength of about 355 nm in pulses of durations of tens of nanoseconds at a pulse repetition rate sufficient to cleave the substrate; and
   (c) translating the laser beam and the substrate with respect to each other to cleave the substrate in a pattern.

33. The method of claim 32 wherein the pulses in the laser beam have a duration of about 40 nanoseconds.

34. The method of claim 32 wherein the repetition rate of the pulses in the laser beam is about 30 kHz.

35. The method of claim 32 further including mounting the crystalline lithium niobate substrate to a translation stage that is translatable in at least x and y directions with respect to the surface of the substrate, and wherein translating the laser beam and the substrate with respect to each other is carried out by translating the stage and the substrate mounted thereto with respect to the laser beam.

36. The method of claim 32 wherein the laser beam from the laser is deflected by a mirror to a lens and is focused by the lens onto the substrate surface.

37. The method of claim 32 wherein the laser beam is focused by a lens to have a beam waist below the substrate surface.

38. The method of claim 32 wherein the energy per laser pulse is about 24 $\mu$j.

39. The method of claim 32 wherein the average power in the laser beam is about 0.74 W.

* * * * *

UNITED STATES PATENT AND TRADEMARK OFFICE
CERTIFICATE OF CORRECTION

| | |
|---|---|
| PATENT NO. | : 6,951,120 B2 |
| APPLICATION NO. | : 10/102621 |
| DATED | : October 4, 2005 |
| INVENTOR(S) | : Leon McCaughan and Chad Matthew Staus |

Page 1 of 1

It is certified that error appears in the above-identified patent and that said Letters Patent is hereby corrected as shown below:

<u>Col. 1, lines 7 & 8</u>: Delete "NSF 9632527 and 0079983" and replace it with --NSF 0079983--.

<u>Col. 9, line 19</u>: Claim 32 delete "mobate" and replace it with --niobate--.

<u>Col. 10, line 20</u>: Claim 38 delete "24 µj" and replace it with --24 µJ--.

Signed and Sealed this

Twenty-seventh Day of November, 2007

JON W. DUDAS
*Director of the United States Patent and Trademark Office*